United States Patent [19]

McLaughlin et al.

[11] 3,897,157

[45] July 29, 1975

[54] COLORIMETER FOR FISH LURE SELECTOR

[75] Inventors: Mano McLaughlin, Geneva; Andrew M. Wohlert, St. Charles, both of Ill.

[73] Assignee: Enertron Corporation, Geneva, Ill.

[22] Filed: Apr. 11, 1974

[21] Appl. No.: 459,912

[52] U.S. Cl. .................... 356/186; 356/178; 43/4
[51] Int. Cl. ...................... G01j 3/48; G02b 5/22
[58] Field of Search .......... 356/186, 187, 177, 192, 356/190, 178

[56] References Cited
UNITED STATES PATENTS
2,898,800  8/1959  Bergson .............................. 346/177

FOREIGN PATENTS OR APPLICATIONS
677,493  6/1939  Germany .......................... 356/177
943,908  6/1956  Germany .......................... 356/177

*Primary Examiner*—Robert Segal
*Attorney, Agent, or Firm*—Edmond T. Patnaude

[57] ABSTRACT

A fish lure selector including a plurality of matched color filters and associated photocells encased in a waterproof housing and connected by a cable to a control circuit for providing a visual indication of the relative intensities of different colors of light below the surface of a body of water.

7 Claims, 4 Drawing Figures

PATENTED JUL 29 1975 3,897,157
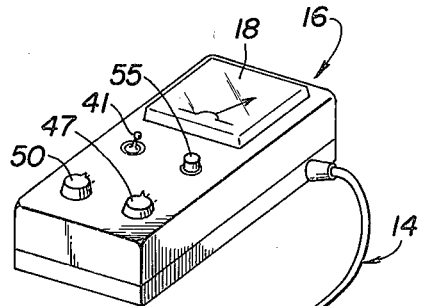
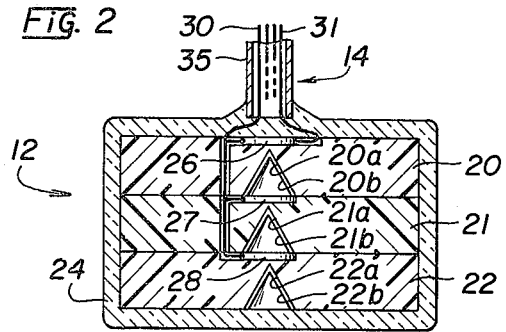
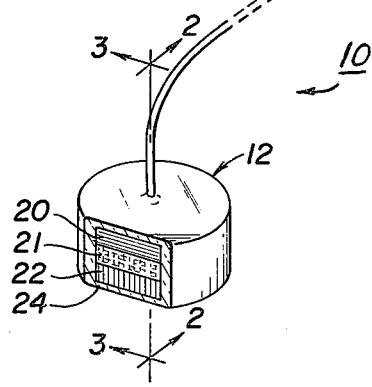
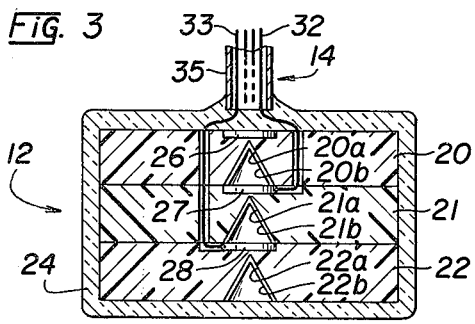
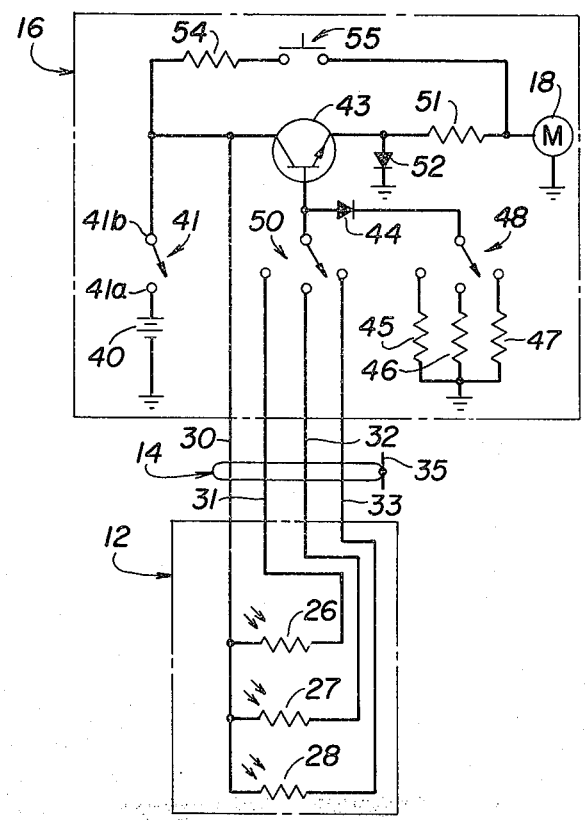

COLORIMETER FOR FISH LURE SELECTOR

The present invention relates in general to a device for indicating which ones of a number of different predetermined colors are visible at particular depths in a body of water, and it relates more particularly to a device suitable for use by fishermen to determine which lure colors will be visible to fish at different depths.

BACKGROUND OF THE INVENTION

It is well known that fish see and distinguish colors. However, a particular lure will only be seen by the fish if the ambient light spectrum includes the particular color of the lure so as to be reflected by the lure. For example, if a red lure is used in ambient light which contains little or no red light, the lure will appear black. Because of the many factors which determine the visible spectrum below the surface in a body of water, the choice of lure colors has in the past been made on the basis of intuition or experience. Our studies show, however, that it is extremely difficult to make any valid predictions on these bases. For example, we have found lakes where blue light substantially disappeared at five feet but was relatively intense below 20 feet while both red and yellow light disappeared at about 4 feet, without reappearing.

OBJECTS OF THE INVENTION

Therefore, a principal object of the present invention is to provide a new and improved device for determining the presence of predetermined colors of light at different depths in a body of water.

Another object of this invention is to provide a portable device, suitable for use by fishermen to determine the lure color best discernible at various depths in a body of water.

A further object of this invention is to provide a device which indicates the relative intensities of different predetermined colors of light below the surface of a body of water.

SUMMARY OF THE INVENTION

Briefly, the above and further objects may be realized in accordance with the present invention by enclosing a plurality of color filters and respectively matched photocells in a watertight casing. The photocells each have a resistance value which varies with the intensity of light impinging thereon. A battery powered control and readout circuit is connected by cable to the photocells to provide a visual readout of the relative intensities of the different light bands passing through the filters. Having used this device to determine which color bands are visible at a particular depth, the fisherman may then select a lure having one of the colors visible at the depth he wishes to fish. If desired, a temperature sensitive device, such as a thermistor may be encased with the filters and photocells to provide a reading of the temperature at the depth of the unit.

GENERAL DESCRIPTION OF THE DRAWING

Further objects and advantages and a better understanding of the present invention can be had by reference to the following detailed description, wherein:

FIG. 1 is a pictorial sketch illustrating one manner in which the instrument of the present invention may be used;

FIG. 2 is a sectional view of a submersible color sensing device embodying certain aspects of the present invention and taken substantially along the line 2—2 of FIG. 1;

FIG. 3 is another sectional view taken along the line 3—3 of FIG. 1; and

FIG. 4 is a schematic diagram of an electric readout circuit embodying the present invention.

DETAILED DESCRIPTION OF THE INVENTION

Referring now to the drawing and particularly to FIG. 1 thereof, a fish lure selector 10 comprises as its principal elements a hermetically sealed, submersible light transducer unit 12 connected by means of a sealed electric cable 14 to a battery powered control and readout unit 16. As more fully described hereinafter the cable 14 includes a plurality of mutually insulated conductors which respectively connect each of a plurality of light transducers in the unit 12 to input terminals in the unit 16. A suitable meter 18 may be selectively energized from the separate inputs to provide a visual indication on the meter of the relative intensities of a plurality of light bands or light colors present at the location of the transducer unit 12. Therefore, with the transducer unit 12 submersed in a body of water at whatever depth the fisherman desires to fish, the instrument 10 will indicate which color or colors will be visible to the fish at that depth.

Referring to FIGS. 2 and 3 it may be seen that the transducer unit 12 comprises a plurality of circular filter discs 20, 21 and 22 stacked one upon the other with light reflecting material between the discs, and encased in a transparent housing 24. The discs are provided with conical recesses 20a, 21a and 22a, a conical reflector 20b, 21b and 22b inside each such recess and a plurality of photocells 26, 27 and 28 disposed above the recesses with the lower light sensitive surfaces of the photocells facing the apexes of the cones. The light waves which pass into the discs through the cylindrical outer surfaces thereof are thus reflected by the conical reflectors in the recesses onto the light sensitive surfaces of the associated photocells. Two leads or conductors extend from each photocell in grooves provided in the upper face of the associated disc to drilled holes through which they extend to the top of the uppermost disc 20. As shown, there is one lead 30 which connects to all three of the photocells and three additional leads 31, 32 and 33 which respectively connect to each of the photocells. All four leads extend inwardly through four radial grooves in the top surface of the disc 20 and into a watertight sheath 35 having its lower end fixedly and sealably connected to the housing 24 at the top center thereof. Preferably the housing is a molded transparent plastic resin such as polyester in which the filter discs, the photocells and the leads are encased or potted. If desired, a temperature sensitive device such as a thermistor may also be encased in the housing and connected to the control unit 16 by a pair of leads also extending through the sheath 35.

The filter discs 20, 21 and 22 pass different colors or spectral light bands whereby the resistance values of the photocells are determined by the intensities of these bands in the ambient light at the location of the unit 12. The filter discs may thus pass red, blue and yellow light respectively. Moreover, each photocell is responsive to the light impinging on the unit 12 from a full 360° whereby this instrument is nondirectional in the horizontal plane and the readings are not affected by the angular orientation of the unit 12 or by nearby objects such as weeds or rocks.

Referring now to FIG. 4, the control and readout circuit there shown is powered by a suitable battery 40 which may be a single dry cell or a plurality of series connected D-cell batteries. The battery 40 is connected between ground and one terminal 41a of an on-off switch 41. The other terminal 41b of the on-off switch is connected to the common conductor 30 in the cable 14 and to a solid state readout circuit including a transistor 43 and a diode 44. More particularly, the positive terminal of the battery 40 is connected by the switch 41 to the collector of the transistor 43. The base of the transistor 43 is connected to the common wiper of the switch 50 and via the diode 44 to an adjustable sensitivity circuit comprising three resistors 45, 46 and 47 having respectively different resistance values selectively connected between the diode and ground by means of a three position selector switch 48. The output of the transistor 43 is taken between the emitter and the ground. As shown, current limiting resistor 51 is serially connected between the emitter of transistor 43 and the meter 18 and a diode voltage limiter 52 is directly connected between the emitter and ground. A battery check circuit includes a resistor 54 and a spring loaded normally open switch 55 serially connected between the on-off switch 41 and the meter 18.

The photocells 26, 27 and 28 have a response which varies with the intensity of the light impinging thereon, i.e., the resistance of conductivity of each cell varies with the intensity of light impinging thereon. We have found that the instrument must respond to very low values of intensity of about .01 to 1 foot candles. In a test conducted in slightly murkey water, the ambient light at a depth of one foot was 81% of the ambient light intensity at the surface while at a depth of forty feet the ambient light was only 0.003 percent of the ambient light intensity at the surface. Moreover, we have found it to be unnecessary to provide a readout which indicates the actual value of the ambient light intensity at any given depth. Hence, a relatively simple and inexpensive readout cirduit provides sufficient information to enable the fisherman to select a lure which is visible to the fish at the depth to be fished.

OPERATION

In use, the fisherman initially checks to make certain that the battery 40 has a sufficient charge to power the instrument. This is done by closing the on-off switch 41 and then depressing the battery check button on the switch 55 to connect the meter 18 directly across the battery 40. If the battery voltage is adequate, say 5.6 volts or more, the meter needle will deflect to a region on the dial above a suitable reference mark. If the battery voltage is lower, the battery should be replaced.

The instrument is then taken to the location to be fished and the transducer unit 12 is lowered to the desired depth. The cable is provided with depth markers at every foot so as to facilitate the positioning of the unit 12 at a specific depth. As noted hereinabove, the desired depth may be determined by initially lowering a temperature sensing device into the water or such a device can be readily incorporated into the unit 12. With the unit 12 at the desired depth, and with the on-off switch closed, the selector switch 48 is set to the high position wherein the biasing voltage from across the resistor 47 is connected to the base of the transistor 43. The color selector switch 50 is then actuated to selectively connect the photocells 26, 27 and 28 to the base of the transistor 43. Any color signal which causes a needle deflection past a graduation mark provided at about the center of the meter dial indicates a very strong color presence and the correspondingly colored lures will be clearly visible to the fish at the depth of the unit 12. If none of the signals are sufficiently strong to deflect the needle to the mark, the intensity switch 48 is set to the low position and the switch 50 is again moved from position to position. Any deflection at all of the meter needle indicates that some, but not much light is present and only those colors which produce at least some deflection will be visible. This latter condition generally occurs in murky waters, on overcast days even in clear water, and in clear water at depths greater than about eighty feet. For intermediate conditions the medium intensity position of the selector switch should be used to prevent damage to the meter and to indicate the relative intensities of the colors of light which are present.

While the actual circuit parameters are not critical the following values provide satisfactory results

| | |
|---|---|
| transistor 43 | 2N2924 |
| diodes 44 and 52 | 1N4001 |
| resistor 45 | 100 K ohms |
| resistor 46 | 27 K ohms |
| resistor 47 | 6.9 K ohms |
| meter 18 | 0-100 micro amp DC |

While the present invention has been described in connection with a particular embodiment thereof, it will be understood by those skilled in the art that many changes and modifications may be made without departing from the true spirit and scope of the present invention. For example, the meter 18 can be calibrated to provide absolute values of light intensity if such information is desired. Therefore, it is intended by the appended claims to cover all such changes and modifications which come within the true spirit and scope of this invention.

What we claim is:

1. A color analyzer for determining the presence of predetermined colors of light at varying depths in a body of water, comprising
   a hermetically sealed housing
   a plurality of light responsive photocells mounted within said housing,
   each of said photocells having a resistance which varies with the intensity of light impinging thereon,
   a plurality of light filters mounted within said housing and each constructed and positioned to direct light from 360° of the ambient onto a respective one of said cells,
   each of said cells and the associated one of said filters being selected to provide an electric signal in response to the presence of a respective one of said colors in the ambient light,
   a control circuit including visual readout means responsive to electric signals supplied thereto, and
   a watertight cable including a plurality of conductors donnected between said cells and said control unit.

2. A color analyzer according to claim 1 wherein said filters are circular discs stacked one upon the other.

3. A color analyzer according to claim 2 wherein each disc has an axially disposed conical recess in one face thereof, and a plurality of conical reflectors are respectively mounted in said recesses.

4. A color analyzer according to claim 3 wherein said cells each have a planar, light sensitive surface and are mounted with said surface facing toward the apex of the associated one of said conical recesses.

5. A color analyzer according to claim 4 wherein said visual readout means is a meter, and said control circuit includes a selector switch for selectively connecting said signals to said meter.

6. A color analyzer according to claim 5 wherein said control circuit includes an amplifier connected between said conductors and said meter, and selector means for setting the gain of said amplifier at selected ones of a plurality of predetermined values.

7. A color analyzer according to claim 6 wherein said control circuit is battery powered, and said meter is a DC ammeter.

* * * * *